(12) United States Patent
Manning et al.

(10) Patent No.: US 8,484,512 B2
(45) Date of Patent: Jul. 9, 2013

(54) THROTTLING NON-DELIVERY REPORTS BASED ON ROOT CAUSE

(75) Inventors: Sara L. Manning, Bellevue, WA (US); Victor Boctor, Redmond, WA (US); Todd Carlyle Luttinen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 12/751,141

(22) Filed: Mar. 31, 2010

(65) Prior Publication Data
US 2011/0246824 A1 Oct. 6, 2011

(51) Int. Cl.
*G06F 11/00* (2006.01)
(52) U.S. Cl.
USPC .............................. 714/18; 714/25; 714/47.1
(58) Field of Classification Search
USPC ...... 714/18, 25, 26, 47.1, 47.2, 47.3; 709/206
See application file for complete search history.

(56) References Cited

U.S. PATENT DOCUMENTS

| | | | |
|---|---|---|---|
| 6,021,262 A * | 2/2000 | Cote et al. | 714/48 |
| 6,941,348 B2 | 9/2005 | Petry et al. | 709/206 |
| 7,624,308 B2 * | 11/2009 | Critchley et al. | 714/47.1 |
| 7,945,813 B1 * | 5/2011 | Watson et al. | 714/18 |
| 2005/0015450 A1 * | 1/2005 | Keohane et al. | 709/206 |
| 2006/0047766 A1 | 3/2006 | Spadea | 709/206 |
| 2006/0085505 A1 | 4/2006 | Gillum | 709/206 |
| 2006/0212522 A1 | 9/2006 | Walter | 709/206 |
| 2007/0233790 A1 | 10/2007 | Agarwal | 709/206 |
| 2009/0187631 A1 | 7/2009 | Su et al. | 709/206 |
| 2009/0217096 A1 | 8/2009 | Ing et al. | 714/37 |
| 2009/0320120 A1 | 12/2009 | Osborne et al. | 726/12 |
| 2010/0323725 A1 * | 12/2010 | Cai et al. | 455/466 |
| 2012/0158867 A1 * | 6/2012 | Levow | 709/206 |

OTHER PUBLICATIONS

International Search Report mailed Dec. 27, 2011, in PCT/US2011/030057.
Microsoft Corporation; "*Troubleshooting Message Delivery Failures in Exchange 2007*"; Jul. 23, 2007; Microsoft TechNet; Exchange Server 2007 SP1; accessed Feb. 8, 2010 at http://technet.microsoft.com/en-us/library/bb691172.aspx; 3 pgs.
"Planning a Messaging Server Sizing Strategy"; Jun. 8, 2009; accessed Feb. 8, 2010 at http://wikis.sun.com/display/CommSuite/Planning+a+Messaging+Server+Sizing+Strategy; 14 pgs.

* cited by examiner

*Primary Examiner* — Joseph D Manoskey
(74) *Attorney, Agent, or Firm* — Merchant & Gould

(57) ABSTRACT

A root cause for a failed attempted delivery of a message is attempted to be determined before sending a non-delivery report (NDR) for the failed message. When a message fails without a known cause, the root cause is determined using the context of the message. For a given context, the root cause may be determined by a single failure or it may be determined by the relative number of failed messages delivery are deferred from being delivered, as is generation of the corresponding same context. While determining the root cause of the problem, any messages failing NDR(s), to allow time for corrective action to occur. If the problem is resolved within a predetermined time period, the deferred messages are delivered without having to issue NDR(s).

19 Claims, 4 Drawing Sheets

THROTTLING NON-DELIVERY REPORTS BASED ON ROOT CAUSE

BACKGROUND

When a messaging service, such as an email service, fails to transmit a message, a non-delivery report (NDR) is issued to the sender. A user attempting to send a message is immediately notified upon a determination that the message can not be sent.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A root cause for a failed attempted delivery of a message is attempted to be determined before sending a non-delivery report (NDR) for the failed message. When a message fails without a known cause, the root cause is determined using the context of the message. For a given context, the root cause may be determined by a single failure or it may be determined by the relative number of failed messages of same context. While determining the root cause of the problem, any messages failing delivery are deferred from being delivered, as is generation of the corresponding NDR(s), to allow time for corrective action to occur. If the problem is resolved within a predetermined time period, the deferred messages are delivered without having to issue NDR(s).

DETAILED DESCRIPTION

Figure 1:
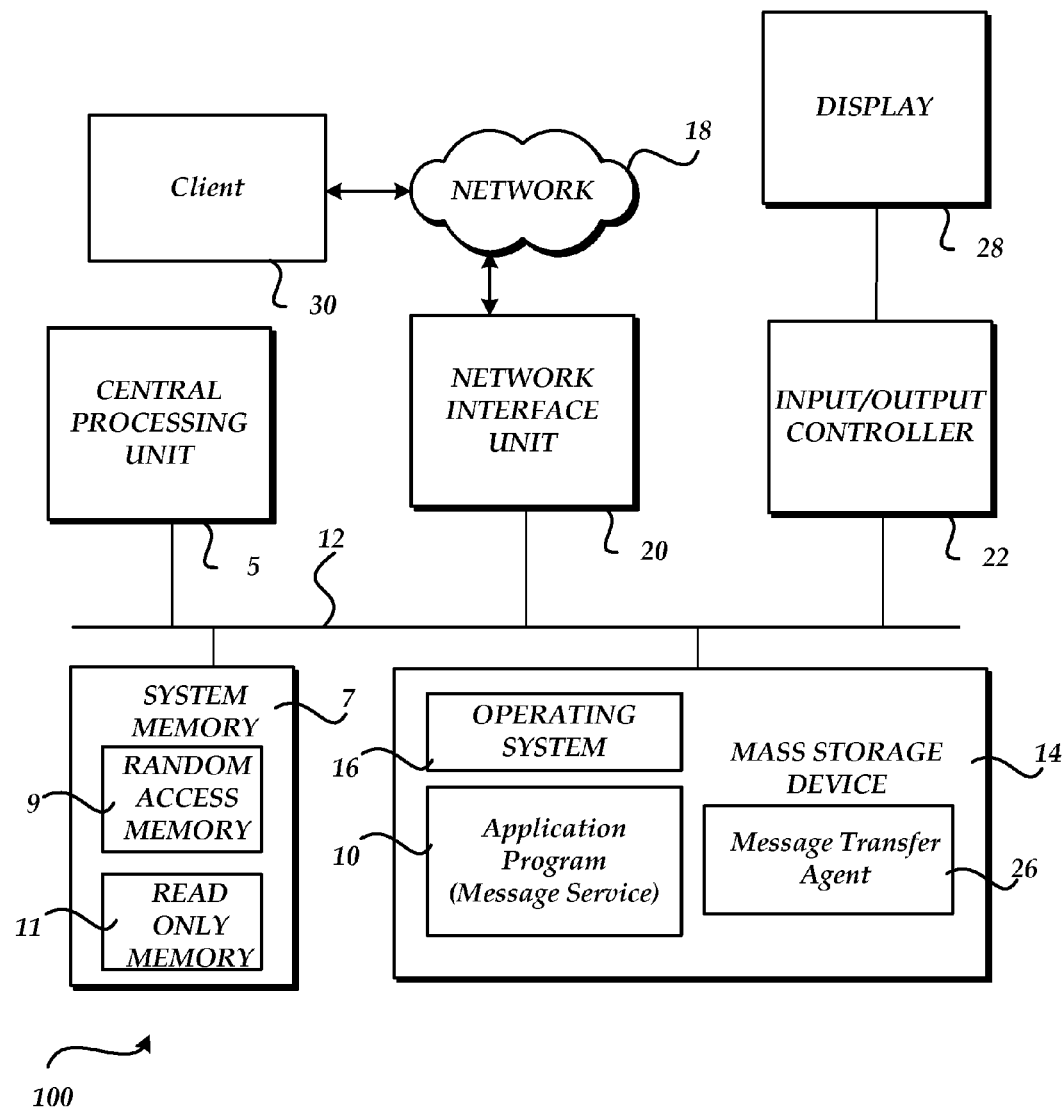
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs 10, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. Computer 100 may be coupled to one or more client devices 30. Each client may be configured to send messages using a messaging application. The messaging application may be many different types of messaging applications that are configured to send and receive messages, such as: email messages and other types of messages. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer and/or a server computer, such as the WINDOWS 7® or WINDOWS SERVER® operating systems from MICROSOFT CORPORATION of Redmond, Wash. The mass storage device 14 and RAM 9 may also store one or more program modules. In particular, the mass storage device 14 and the RAM 9 may store an application program 10, such as a messaging service for sending and receiving messages. For example, the messaging service may be an email service, such as the MICROSOFT OUTLOOK® email application and MICROSOFT EXCHANGE® server application.

Although messaging transfer agent 26 is shown separate from application program 10, it may be included within application program 10. As will be described in greater detail below, the messaging transfer agent 26 is configured to assist in suppressing the generation of non-delivery reports for a period of time. Instead of immediately generating and sending a non-delivery report (NDR) for a failed message, a root cause for the failure is attempted to be determined with a determined time frame. When a message fails without a known cause, the context of the message is used in determining the root cause. For a given context, the root cause may be determined by a single failure and/or it may be determined by a set of failed messages. While determining the root cause of the problem, any failed messages are deferred from being delivered and are temporarily stored to allow time for corrective action to occur. If the problem is mitigated within the predetermined time period, the deferred messages are delivered without having to generate and send an NDR for the original failure.

Figure 2:
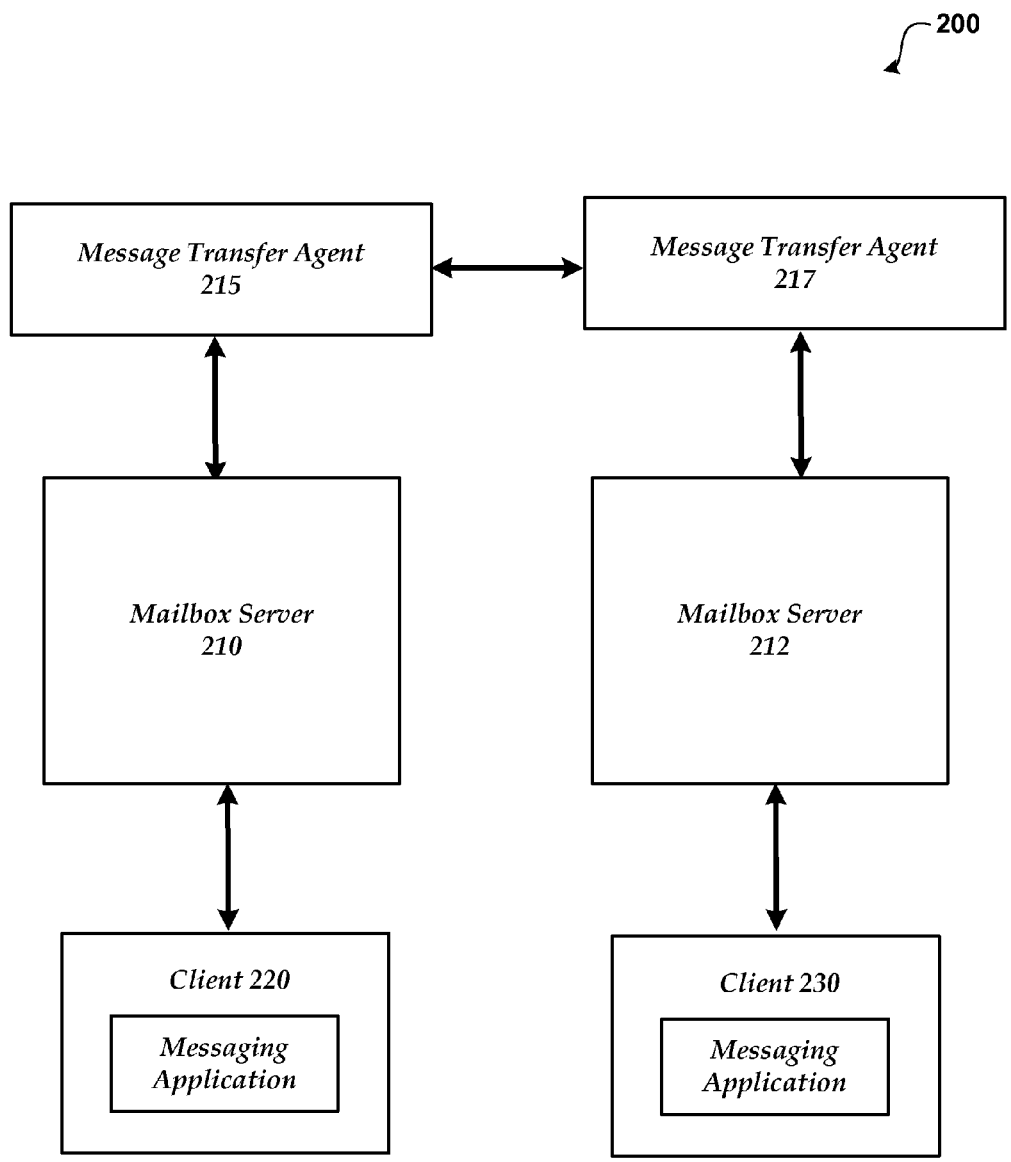
FIG. 2 shows a system for suppressing the sending of non-delivery reports (NDRs) for failed messages.

FIG. 2 shows a system 200 for suppressing the sending of non-delivery reports (NDRs) for failed messages. As illustrated, system 200 includes mailbox servers 210 and 212, message transfer agents 215 and 217, and clients 220 and 230.

As briefly described above, message transfer agent 215 and 217 are directed at suppressing the generation of NDRs while attempting to determine a root cause for the failure of an attempted delivery of a message. For example, when a message fails, the root cause is identified by a message transfer agent using the message context, the message failure's error code and a relative number of such failures over time or for a given number of messages. According to one embodiment, the message failure's error code follows an industry standard defined by the IETF (Internet Engineering Task Force) that provides many different error codes in the form "5.X.X" plus the source that failed the message. Other types of error codes may be used. Depending on the error code that is returned and the context of the message further sampling of additional messages over a period of time (e.g. minutes) may be needed to determine root cause. Once a root cause is determined, the associated set of mitigation parameters are applied. These parameters may include escalation workflow, retry interval, and expected time to resolution (TTR) Different TTRs may be established for different root causes. For example, one minute, fifteen minutes, four hours, and the like.

The message context is comprised of the values of the set of properties on a message that is relevant in determining why the message failed. For a given root cause, one or more properties may be included in the relevant context. For example, properties that may be relevant to a message may include, but are not limited to: internal vs. external bound or sourced, whether the message is encrypted, the size of the message, whether sender was authenticated, unauthenticated, and the like.

The following example is provided for illustration purposes and is not intended to be limiting. Assume that client 220 attempts to send a message to client 230. Mailbox server 210 receives the message from client 220 and message transfer agent 215 attempts to deliver the message to message transfer agent 217. In response to the attempt to send the message, a failure is generated and an error code is returned. For example, the failure may return the 5.6.0 "Content Conversion Error" error code. Instead of mailbox server 210 immediately sending an NDR to client 220 showing the failure of the message, message transfer agent 215 temporarily stores the message, such as in mailbox server 210 or some other temporary storage and attempts to determine the root cause for the failure. Assume for the example, that the message context for the failed message indicates that the message sender is internal and authenticated.

The following table illustrates two root cause definitions that may apply for this failure code:

| ERROR CODE | CONTEXT | % failed | Min sample | Cause |
|---|---|---|---|---|
| 5.6.0 Content Conversion Error | Auth Sender | 1 | 1 | Process Failure |
| 5.6.0 Content Conversion Error | UnAuth Sender | 5 | 100 | Process Failure |

In this example, since the message context includes "authenticated sender," this singleton message failure indicates the root cause (min sample=1) and no further sampling is required to determine the root cause.

If the message context indicated that the sender was not authenticated, then the message transfer agent that received the failure (in this example message transfer agent 215) would sample a number of messages (e.g. the next 100 messages) from unauthenticated senders to help determine the root cause. The sampling period and/or the number of messages sampled may be set many different ways. For example, a fixed period of time could be specified in which to sample messages, a fixed number of messages could be sampled or a combination of a period of time and a number of messages may be used. For example, in the present example, if within the fixed sampling period, this sample both included 100 messages and had 5 failed messages with 5.6.0 "Content Conversion Error" then the root cause would be positively identified.

As discussed above, rather than generating and delivering an NDR immediately, message failures are deferred for a fixed period to allow for possible corrective action to be taken when a root cause is determined. The fixed period of time may change depending on the root cause and message context. For example, a message transfer agent may set the fixed period to two hours for one root cause, fifteen minutes for another root cause, four hours for another root cause, and the like. In the current example, the root cause is a server process failure. In this case it may have been predetermined that a two hour time period is needed to correct the problem. This time information may be stored with each message being temporarily stored and/or stored in some other location, such as a spreadsheet, file, database and the like. Once the root cause is identified a message may be sent to an operator requesting a corrective action to occur. For example, the operator may be notified to restart the appropriate process on the affected server.

Upon determining the root cause, the message transfer agent sets the fixed period of time in which to resolve the problem that is identified by the root cause. During this time, message transfer agent periodically retries delivery of the message(s) associated with the root cause that are temporarily stored. According to one embodiment, retry intervals are predefined as part of a set of mitigation parameters associated with each root cause as described above. According to one embodiment, messages may be failed at any point during the fixed period based on some other determination such as an authorized user manually failing the messages that are associated with a root cause.

During the fixed time period, the message transfer agent continues to attempt delivery of the message based on a predefined retry interval. When the root cause of the failure is corrected before the fixed period elapses, any deferred messages that are temporarily stored are submitted back into pipeline on next retry by the message transfer agent and are delivered to the recipient normally. According to one embodiment, when the fixed time period elapses then the message transfer agent attempts one more delivery of the messages that are temporarily stored. If the delivery fails an NDR is generated and delivered.

While an example failure's error code has been illustrated above, there are many different types of error codes that can be returned depending on the failure encountered. For example, there may be ten, twenty, fifty or one hundred error codes, which are a combination of the type of error (identified by 5.X.X) and the source of the error (Invalid Recipient Object). Message context plus error codes are the information on message failures that are used to evaluate root cause. For example, the table below illustrates two more possible error codes that together with their contexts are determined to be part of a sample set used toward determining root cause.

| ERROR CODE | CONTEXT | % failed | Min sample | Cause |
| --- | --- | --- | --- | --- |
| 5.1.1 Recipient Not Found | Internal Remote forest recipient | 10 | 500 | Directory Sync ops issue |
| 5.2.0 Invalid Recipient Object | Internal Local forest recipient | 1 | 1 | Directory misconfiguration |

Figure 3:
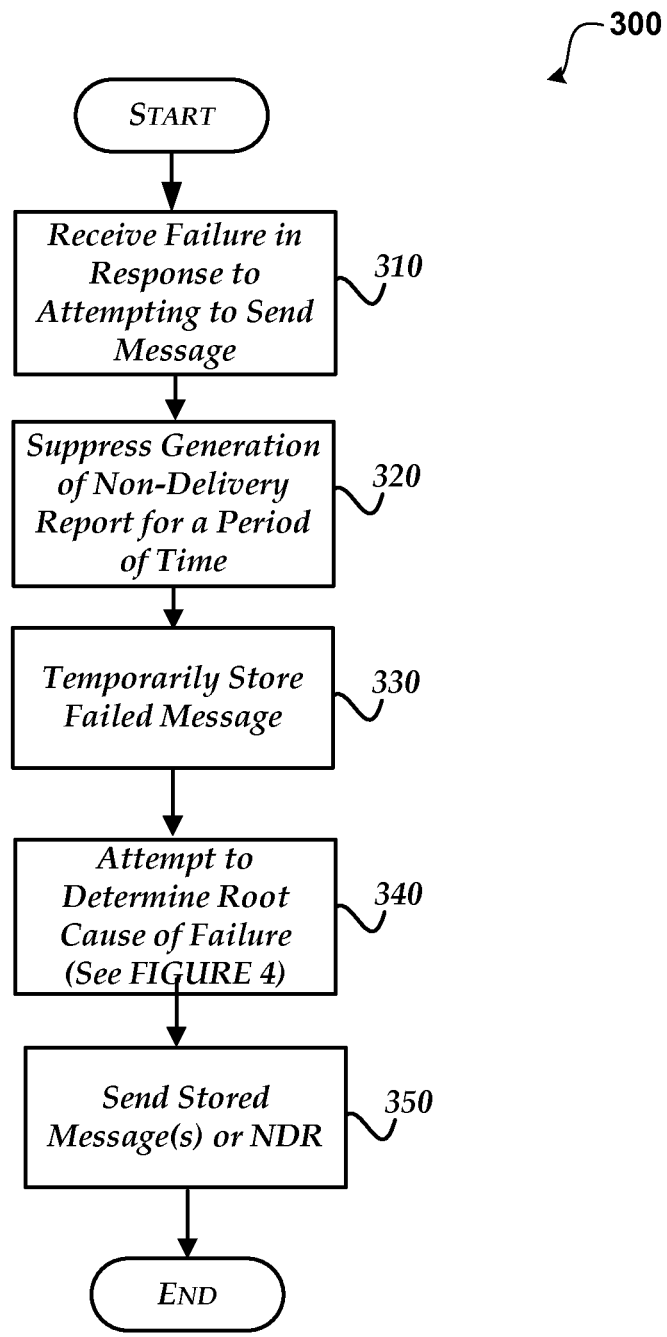
FIG. 3 illustrates a process for suppressing delivery of NDRs.
Figure 4:
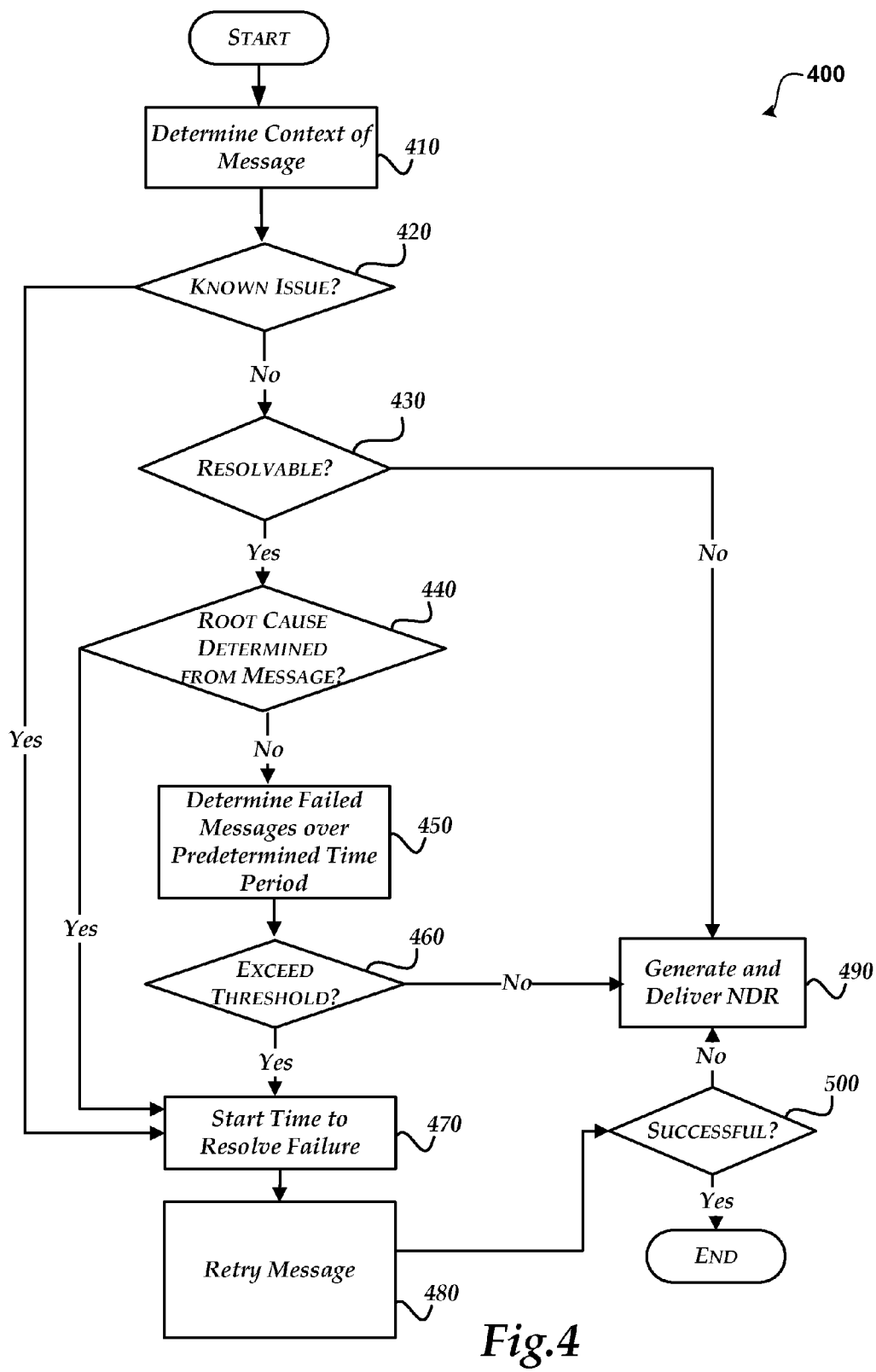
FIG. 4 shows a process for attempting to determine a root cause of a failed delivery of a message.

Referring now to FIGS. 3-4, an illustrative process for suppressing generation of NDRs will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Turning now to FIG. 3, after a start operation, the process flows to operation 310, where a failure is received in response to an attempt to send a message. For example, a failure may be received in response to an attempted delivery of an email message from one user to one or more other users.

Moving to operation 320, the generation and delivery of a Non-Delivery Report (NDR) is suppressed. Instead of sending an NDR immediately upon receipt of the failure for the message, the NDR is suppressed for a period of time. The period of time may change based on whether a root cause for the failure can be determined as well as what type of root cause is determined. For example, an initial period of time (e.g. five minutes, ten minutes, one hour) may be set to determine the root cause. Once the root cause is determined, the period of time in which to delay NDR of the message and attempt to fix the problem so that message may continue its path may be set to another value such that the problem may be resolved.

Flowing to operation 330, the failed message is temporarily stored for the determined period of time. The failed message is stored such that the message may be attempted to be delivered at a later time.

Moving to operation 340, the root cause for the failure of the attempted delivery of the message is attempted to be determined. Generally, an analysis of the context of one or more messages is examined to determine whether or not a root cause for the problem can be determined (See FIG. 4 and related discussion).

Transitioning to operation 350, once the root cause has been attempted to be determined, either the stored message(s) are sent to their destination or any applicable NDRs relating to the failed attempt at delivery of the message are generated and sent.

The process then moves to an end operation and returns to processing other actions.

FIG. 4 shows a process for attempting to determine a root cause of a failed delivery of a message.

After a start block, the process flows to operation 410, where a context of the message is determined. The message context can be determined by examining the properties on a message that are relevant in determining why the message failed. For example, properties that may be relevant to a message may include, but are not limited to: internal vs. external bound or sourced, whether the message is encrypted, the size of the message, whether sender was authenticated, unauthenticated, and the like. An error code returned in response to the failed delivery of the message may also be used in attempting to determine the root cause of the failure. The error code may specify different information. For example, the error code may specify a content conversion error, authentication required, recipient not found, and the like.

Flowing to decision operation 420, a determination is made as to whether the failure is caused by a known issue. For example, a root cause for the failure may have already been determined in response to receiving a previous failure of a message having the same/similar message context. In this case, generation of the NDR is delayed for the remaining time left in the "Time to Resolve Failure" countdown When there is a known issue and an attempt has started to correct the problem identified by the root cause, the process moves to operation 470, where the time to resolve failure period is started and the message is attempted to be delivered again.

When there is not a known issue, the process flows to operation decision operation 430, where a determination is made as to whether the failure is resolvable (i.e. whether the failed message has a context+error code for which a root cause is indicated) such that the message may be successfully delivered at a later time after the problem is resolved.

When the issue is not resolvable as identified by the message context and error code, the process flows to operation 490 where an NDR is generated and delivered for the failed message.

When the issue is initially determined to be resolvable, the process flows to decision operation 440, where a determination is made as to whether the root cause may be determined from the message context and error code for the message.

When the root cause is determined from the single message, the process moves to operation 470, where the time to resolve the failure is started.

When the root cause can not be determined from the message, the process flows to operation 450.

At operation 450, a set of messages having the same error code and context are examined to determine a root cause for the failure. For example, messages that fail over a specified period of time and/or after a predetermined number of messages may be sampled.

Moving to decision operation 460, a determination is made as to whether the number of messages that fail within the sample exceed a predetermined threshold, and in some cases that the total number of messages sampled was high enough to provide an accurate indication. For example, it may be determined that at least ten percent of messages need to fail within the sample. Other methods for determining failure may also be used. For example, different types of errors may use different thresholds.

When the sampling results in a number of failed messages does not exceed the threshold, the process flows to operation 490, where an NDR is generated and delivered for the deferred messages having a matching context.

When the sampling results in a number of failed messages exceeding the threshold, the process flows to operation 470.

At operation 470, the time to resolve the problem (associated with the root cause) is initiated. During the time to resolve period, no NDRs are sent for the message(s) having the same context that fail the initial delivery attempt. The fixed period of time to resolve the problem varies depending on the root cause and message context. For example, the fixed period may be set to two hours for one root cause, fifteen minutes for another root cause, four hours for another root cause, and the like. This time information may be stored with each message being temporarily stored and/or stored in some other location, such as a spreadsheet, file, database and the like.

Flowing to operation 480, the failed message is retried during the fixed period of time that is identified as the time to correct the problem. During this time, the failed message is periodically retried for delivery.

Decision operation 500 determines whether the delivery of a message is successful. The delivery could be the delivery to the next hop (such as another message transfer agent) or to the destination mailbox. When the delivery of a message is successful the process flows to an end block and original message is sent on its intended path for delivery When the delivery of a message is not successful after the expiration of the time to resolve period, the process flows to operation 490 where an NDR is generated and sent for the failed message.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for throttling the delivery of non-delivery reports (NDRs), comprising:
    receiving a failure in response to attempting to send a message;
    suppressing a generation and delivery of a NDR for a period of time while determining a root cause for the failure within the period of time; wherein determining the root cause for the failure comprises determining an error code that is returned in response to the failure of the message;
    storing the message that failed delivery during the period of time;
    attempting to correct the root cause for the failure during a next period of time; and
    sending the stored message when the root cause for the failure is corrected within the next period of time and generating and sending the NDR when the root cause for the failure is not corrected within the period of time.

2. The method of claim 1, wherein determining the root cause for the failure comprises determining a context of the message.

3. The method of claim 1, wherein the period of time is set based on a context of the message and the error code that is returned in response to the failure of the message.

4. The method of claim 1, wherein determining the root cause for the failure comprises examining a delivery status of a group of like messages having a matching context attempting to be delivered.

5. The method of claim 4, wherein examining the delivery status of the group of like messages attempting to be delivered comprises determining a percentage of the like messages that fail during the attempted delivery of the group of messages.

6. The method of claim 1, further comprising re-submitting a group of messages for re-delivery.

7. The method of claim 1, further comprising failing the delivery of the message before the period of time expires and sending the NDR.

8. The method of claim 1, further comprising generating an alert to trigger corrective action to address the root cause and periodically attempting to deliver the message during the next period of time.

9. A computer-readable storage device having computer-executable instructions for throttling the delivery of non-delivery reports (NDRs), the instructions comprising:
    suppressing a generation of a NDR for a period of time while determining a root cause for a failure of an attempted delivery of a message, wherein determining the root cause for the failure comprises determining an error code that is returned in response to the failure of the message;
    attempting to correct the root cause for the failure during the period of time; and
    sending the message that failed delivery when the root cause for the failure is corrected within the period of time such that the NDR is never sent for the failed delivery of the message and generating and sending the NDR when the root cause for the failure is not corrected within the period of time.

10. The computer-readable storage device of claim 9, wherein the period of time is set based on a context of the message and the error code that is returned in response to the failure of the message.

11. The computer-readable storage device of claim 9, wherein determining the root cause for the failure comprises examining a delivery status of a group of messages of similar context attempting to be delivered.

12. The computer-readable storage device of claim 11, wherein examining the delivery status of the group of messages attempting to be delivered comprises determining a percentage of the messages that fail during the attempted delivery of the group of messages.

13. The computer-readable storage device of claim 9, further comprising failing the delivery of the message before the period of time expires and sending the NDR.

14. The computer-readable storage device of claim 9, further comprising periodically attempting to deliver the message during the period of time.

15. A system for throttling the delivery of non-delivery reports (NDRs), comprising:
    a processor and a computer-readable storage medium;
    an operating environment stored on the computer-readable storage medium and executing on the processor;
    a network connection, and a message transfer agent operating under the control of the operating environment and operative to perform actions, including:

suppressing the generation of a NDR for a period of time while determining a root cause for a failure of an attempted delivery of a message; wherein determining the root cause for the failure comprises determining an error code that is returned in response to the failure of the message;

attempting to correct the root cause for the failure during the period of time; and sending the message that failed delivery when the root cause for the failure is corrected within the period of time such that the NDR is never sent for the failed delivery of the message and sending the NDR when the root cause for the failure is not corrected within the period of time.

16. The system of claim 15, wherein the period of time is set based on a context of the message and the error code that is returned in response to the failure of the message.

17. The system of claim 15, wherein determining the root cause for the failure comprises examining a delivery status of a group of messages of matching context attempting to be delivered and determining when a number of failed messages from the group of messages having the matching context fail exceed a threshold value.

18. The system of claim 17, periodically attempting to deliver the message during the period of time wherein examining the delivery status of the group of messages attempting to be delivered comprises determining a percentage of the messages that fail during the attempted delivery of the group of messages.

19. The system of claim 15, further comprising failing the delivery of the message before the period of time expires and sending the NDR.

* * * * *